United States Patent [19]

Kronberg

[11] Patent Number: 5,147,471
[45] Date of Patent: Sep. 15, 1992

[54] SOLDER FOR OXIDE LAYER-BUILDING METALS AND ALLOYS

[76] Inventor: James W. Kronberg, 108 Independent Blvd., Aiken, S.C. 29801

[21] Appl. No.: 681,290

[22] Filed: Apr. 8, 1991

[51] Int. Cl.$^5$ .............................................. C22C 28/00
[52] U.S. Cl. ...................................... 420/556; 148/24; 420/561; 420/562
[58] Field of Search ........................ 420/556, 561, 562

[56] References Cited

U.S. PATENT DOCUMENTS

| | | | |
|---|---|---|---|
| 863,058 | 8/1907 | Ellis | 420/562 |
| 1,239,785 | 9/1917 | Gardiner | 420/561 |
| 1,619,852 | 3/1927 | Conti . | |
| 2,252,414 | 8/1941 | Riesmeyer | 75/175 |
| 2,505,633 | 4/1950 | Whaley | 420/556 |
| 2,552,935 | 5/1951 | Chadwick et al. | 75/175 |
| 2,733,168 | 1/1956 | Hodge et al. | 117/50 |
| 2,766,152 | 10/1956 | Wainer | 420/556 |
| 2,864,733 | 12/1958 | Kranich | 148/24 |
| 3,087,813 | 4/1963 | Ueno et al. | 75/175 |
| 3,146,097 | 8/1964 | Allen | 75/175 |
| 3,457,067 | 7/1969 | Allen | 75/175 |
| 4,386,051 | 5/1983 | Edgington | 420/589 |
| 4,670,217 | 6/1987 | Henson et al. | 420/562 |
| 4,695,428 | 9/1987 | Ballentine et al. | 420/561 |

*Primary Examiner*—Peter D. Rosenberg
*Attorney, Agent, or Firm*—Harold M. Dixon; William R. Moser; Richard E. Constant

[57] ABSTRACT

A low temperature solder and method for soldering an oxide layer-building metal such as aluminum, titanium, tantalum or stainless steel. The comosition comprises tin and zinc; germanium as a wetting agent; preferably small amounts of copper and antimony; and a grit, such as silicon carbide. The grit abrades any oxide layer formed on the surface of the metal as the germanium penetrates beneath and loosens the oxide layer to provide good metal-to-metal contact. The germanium comprises less than aproximatley 10% by weight of the solder composition so that it provides sufficient wetting action but does not result in a melting temperature above approximately 300° C. The method comprises the steps rubbing the solder against the metal surface so the grit in the solder abrades the surface while heating the surface until the solder begins to melt and the germanium penetrates the oxide layer, then brushing aside any oxide layer loosened by the solder.

10 Claims, No Drawings

SOLDER FOR OXIDE LAYER-BUILDING METALS AND ALLOYS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to solder for oxide layer-building metals and alloys. In particular, the present invention concerns low-temperature solder which produces a high-strength, electrically-conductive, metallurgical bond between aluminum and aluminum alloys.

2. Discussion of the Background

Aluminum is relatively cheap, lightweight and, on a weight-for-weight basis, the best electrical conductor at ordinary temperatures. Unfortunately, it is also an oxide layer-building metal: it is highly reactive and when exposed to air quickly forms a surface layer of hard oxide which is electrically nonconductive. Other oxide layer-building metals and alloys include titanium, tantalum and stainless steel.

Although several methods exist for joining aluminum to itself or to other metals, none is very satisfactory for electrical purposes. Mechanical methods, such as bolting or clamping, cannot produce a metallurgical bond. In time, oxidation intrudes into the joint and creates a high-resistance region. This problem is made worse by thermal cycling since the difference in the expansion coefficients of aluminum and other common metals will inevitably loosen any mechanical joint. Welding can metallurgically join aluminum to itself and its alloys but requires elaborate and specialized equipment. For example, to weld aluminum, the aluminum must be brought to its melting temperature of 660.5° C. Also, to prevent fresh oxidation while welding, oxygen from the air must be excluded. Although air exclusion may be accomplished easily in an industrial setting with a flow of inert gas for welding, this technique is not very practical for common "benchtop" use where special atmospheres for soldering are not readily available.

Furthermore, benchtop soldering tools achieve temperatures that are usually no higher than 300° C., too low to cause the aluminum to melt and flow together. Soldering consists of the addition of a second, lower-melting point metal or alloy which has the power to penetrate and lift the surface oxides and wet the aluminum beneath, forming a metallurgical bond. Typically, this occurs only over small portions of the interface, and the joint is likely to perform poorly, both electrically and mechanically. Performance is usually somewhat improved if the oxide layer is mechanically abraded while it is covered by the molten solder.

Solders tried for use on aluminum have usually consisted of tin and zinc in a roughly two-to-one ratio by weight, with or without small amounts of other metals. The other metals added to the tin-zinc solder include aluminum, lead, copper, silver, antimony, arsenic, bismuth and cadmium, among others. While these alloys have some limited ability to penetrate under and lift the oxide coating from the aluminum surface, none performs well at temperatures attainable with benchtop soldering tools. Most efforts to develop an aluminum solder of this type were conducted between the mid-nineteenth century and the 1950's, apparently with little effort expended thereafter.

A solder must have the capacity to form metallurgical bonds with the two base metals that are being joined. The bonding process results in the formation of an alloy characterized by atoms of the solder composition interspersed between atoms of the base metal. The solder must be free to flow yet be capable of bridging gaps or creating small fillets. When the solder is heated to the molten state, it exists as a droplet as a result of the attraction of the molecules within the alloy. If, however, the attraction of its molecules to the base metal equals or exceeds their attraction for each other, the solder easily flows onto, or wets, the surface to which it is being applied.

Germanium, which is found in ores of zinc and silver, and as a trace impurity in coal, is a hard, brittle substance resembling silicon. Its atomic number is 32. Chemically, it is a "metalloid" with properties somewhere between those of metals and nonmetals. While forming a minor ingredient in alloys such as dental gold, germanium did not see widespread use until the late 1940's, when its semiconducting properties were discovered and ushered in the modern age of solid-state electronics. It has since been replaced in nearly all electronics applications by silicon which is less expensive, more easily fabricated, and performs better at high temperatures.

Germanium melts at 938.3° C., well above aluminum, but is easily dissolved by some other molten metals at considerably lower temperatures. High-purity, molten germanium has the peculiar property of wetting and sticking tightly to virtually any substance, metallic or non-metallic. This property appears also in some of its alloys in which germanium acts as a wetting agent.

The need to abrade the surface of oxide-layer forming metals and metal alloys has long been recognized. Methods for preparing metal surfaces usually require removal of this layer before application of the solder. Conti, in U.S. Pat. No. 1,619,852, describes a solder that requires no scraping or cleaning of the surface before soldering. In U.S. Pat. No. 2,733,168, Hodge, et al. describe a solder composition that is sufficiently hard that sticks made of the solder can be used to scrape the metal surface (Column 2, lines 61, et seq.). Riesmayer, in U.S. Pat. No. 2,252,414, discloses the use of a small amount of manganese and/or nickel but specifies that the solder should be free of copper for the solder to penetrate the oxide film. In U.S. Pat. No. 2,552,935, Chadwick uses cerium as a "wetting agent" as well for improved corrosion resistance.

There is a need for a solder which will provide a bond of high mechanical strength and electrical conductivity under common soldering conditions.

SUMMARY OF THE INVENTION

According to its major aspects, the solder of the present invention contains tin, zinc, and germanium, and may additionally have small amounts of other metallics such as copper and antimony. Preferably, a gritty component such as silicon carbide is mixed with the solder of the present invention.

The amount of germanium included should be sufficient to achieve wetting while still providing a solder having a melting point at benchtop conditions, less than 300° C. Preferably, germanium comprises not more than 10% and tin and zinc are present in a 2:1 ratio. The grit also comprises not more than 10% and is preferably approximately 200 mesh.

A feature of the solder of the present invention is germanium, which in its molten state shows exceptional power to wet other substances, both metallic and nonmetallic. A small amount of germanium added to a roughly two-to-one tin-zinc combination has a melting point that is eutectic or near-eutectic within the practical benchtop soldering temperature range of approximately 150° C. to 330° C., yet retains some of germanium's wetting ability. The eutectic point is the lowest melting temperature of a combination of two or more substances. Furthermore, germanium atoms in the solder tend to coat the surfaces of materials, forming a boundary layer with high adhesive strength which enhances the solder's ability to lift and remove the surface oxide layer. While a few other metals, notably gallium, share germanium's wetting properties when molten, they have much lower melting points and would be unlikely to form a satisfactory alloy with zinc and tin. Gallium is also highly toxic.

Another feature of the present invention is the use of a grit in the solder itself. The grit can be used to mechanically abrade the oxide layer thereby exposing clean, unoxidized metal below to which the solder can adhere. Because of better metal-to-metal contact, the resulting joint will have better electrical properties. Furthermore, the combination of the grit and the wetting action of germanium results in a more complete removal of the oxide layer than would either feature alone.

Another feature of the present invention is the addition of other metals, such as copper and antimony, to the solder. These other metals improve the hardness, toughness and tensile strength of the solidified tin-zinc-germanium solder by forming intermetallic compounds with zinc and tin.

Other features and advantages of the present invention will be apparent to those skilled in the art from a careful reading of the Detailed Description of a Preferred Embodiment that follows.

DETAILED DESCRIPTION OF A PREFERRED EMBODIMENT

The solder of the present invention is composed of tin, zinc, germanium, and optionally one or more other metals. The preferred other metals are copper and antimony. The tin and zinc are combined in an approximate two-to-one ratio by weight, and germanium is added in an amount sufficient to cause the solder to wet the surface to which it is applied but not to raise the melting temperature above benchtop level, which is defined to be less than approximately 300° C.

The three components, tin, zinc and germanium will have in combination a lower melting temperature than any of the three individually. One combination will have the lowest melting temperature, which is called the eutectic point. Because germanium's melting temperature is relatively high, the quantity of germanium added cannot be too great, yet must be sufficient to provide the wetting action required to lift the oxide layer from the metal or metal alloy to which it is applied.

Copper and antimony, individually or in combination, may also be added to the solder. These metals would give much needed toughness to the solidified solder. In a cooling melt, antimony reacts with zinc and tin to form hard, blocky crystals of intermetallic compounds. Copper does the same, but the crystals of its compounds are needle-like. Together, like reinforcing rods and chunks of gravel in concrete, these help stop the propagation of cracks and hold the mass together under tension.

A nonmetallic grit component also may be added to the solder. Silicon carbide is the preferred nonmetallic grit component. It is mixed thoroughly to distribute grit particles evenly through the alloy. The preferred size of silicon carbide is 200-mesh.

The alloy is fabricated by drawing, casting, extrusion or powder compression, depending upon its ductility and the desired final form. Preferably, this consists of stiff wire or pencil-like rods, which may contain a flux held in lengthwise channels or as an exterior coating; flux may also be used in the form of a soldering paste into which the wire or rod is dipped before soldering, or which is rubbed onto the metal prior to the soldering process.

The most preferred composition of the solder of the present invention is 50-70% by weight tin, 25-40% by weight zinc, 0.1-10% by weight germanium, 0.1-5% by weight copper, 0.1-5% by weight antimony, and 1-10% by weight 200-mesh silicon carbide.

In use, the end of the solder wire or rod is rubbed gently against the piece to be soldered as the piece is heated until the solder begins to melt. The abrasion of the embedded grit particles creates small channels through which the newly-molten solder can reach the aluminum surface. The combination of the wetting action of germanium and the scarring of the oxide layer by the grit enables the alloy to penetrate beneath the oxide layer (and on top of it as well) so that the oxide is easily brushed out of the way, leaving a clean and metallurgically-bonded metallic surface layer, composed chiefly of tin-zinc alloy. The soldering may take place in air and at temperatures less than approximately 300° C.

Once established, the surface layer may be joined to other metals in a variety of ways. Two such surfaces may simply be placed in contact and heated, causing the alloy coatings to melt and fuse together. Usually, both surfaces may be coated and joined in a single operation. The solder may be used to join aluminum or aluminum alloys or to join aluminum and aluminum alloys to other metals. The solder may also be applied to other oxide-forming metals such as titanium, tantalum and stainless steel. For example, aluminum may be joined to copper or one of its alloys, provided that both pieces have been previously coated with solder. In the case of copper, the solder may be an ordinary tin-lead alloy. Alternatively, if the copper is very clean, or covered by a suitable flux, it is wetted by the tin-zinc-germanium solder already coating the aluminum. Even mechanical bonding methods are likely to give better results if contact is made between solder-coated surfaces, since no aluminum is exposed to possible oxidation at the interface.

It will be apparent to those skilled in the art that many changes and substitutions can be made to the preferred embodiment herein described without departing from the spirit and scope of the present invention which is defined by the appended claims.

What is claimed is:

1. A solder for use on a metal surface, said solder comprising tin, zinc, and germanium, said germanium comprising between 0.10 and 10% of said solder by weight.

2. The solder as recited in claim 1, wherein said solder includes sufficient germanium to wet said surface.

3. The solder as recited in claim 1, wherein said solder includes sufficient germanium to wet said surface and said solder has a melting temperature less than approximately 300° C.

4. The solder as recited in claim 1, wherein said solder comprises 50-70 percent tin, 25-40 percent zinc and 0.1-10 percent germanium.

5. The solder as recited in claim 1, further comprising means for abrading said surface, said abrading means mixed with said solder.

6. The solder as recited in claim 1, further comprising grit for abrading said surface, said grit mixed with said solder.

7. The solder as recited in claim 6, wherein said grit comprises not more than 10% of said solder by weight.

8. The solder as recited in claim 1, further comprising copper.

9. The solder as recited in claim 1, further comprising antimony.

10. The solder as recited in claim 1, further comprising copper and antimony, said copper comprising 0.1-5 percent by weight of said solder, and said antimony comprising 0.1-5 percent by weight of said solder.

* * * * *